Sept. 2, 1947.  R. DUPONT  2,426,767
RUBBER VULCANIZING MACHINE
Filed Oct. 6, 1938  3 Sheets-Sheet 3
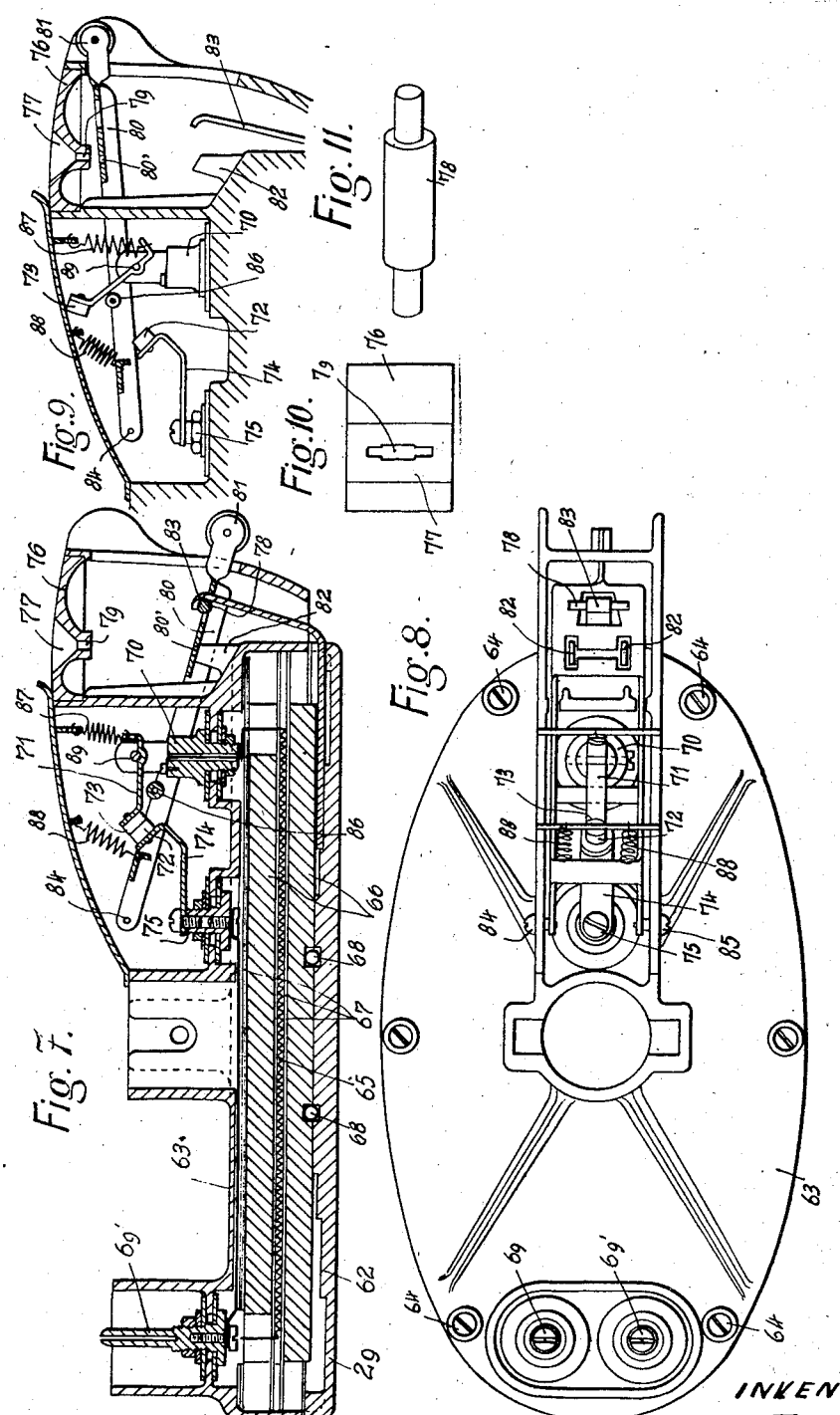

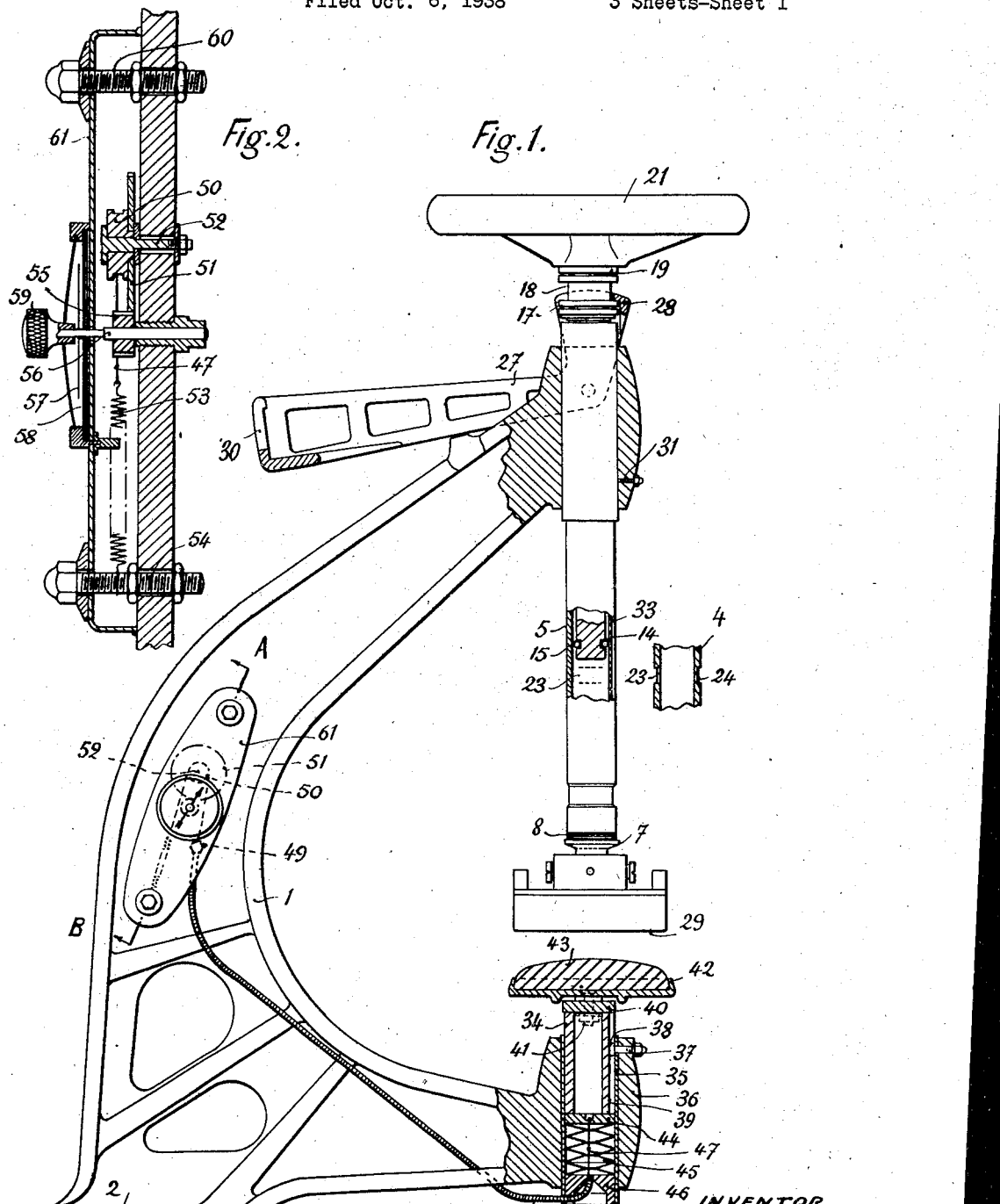

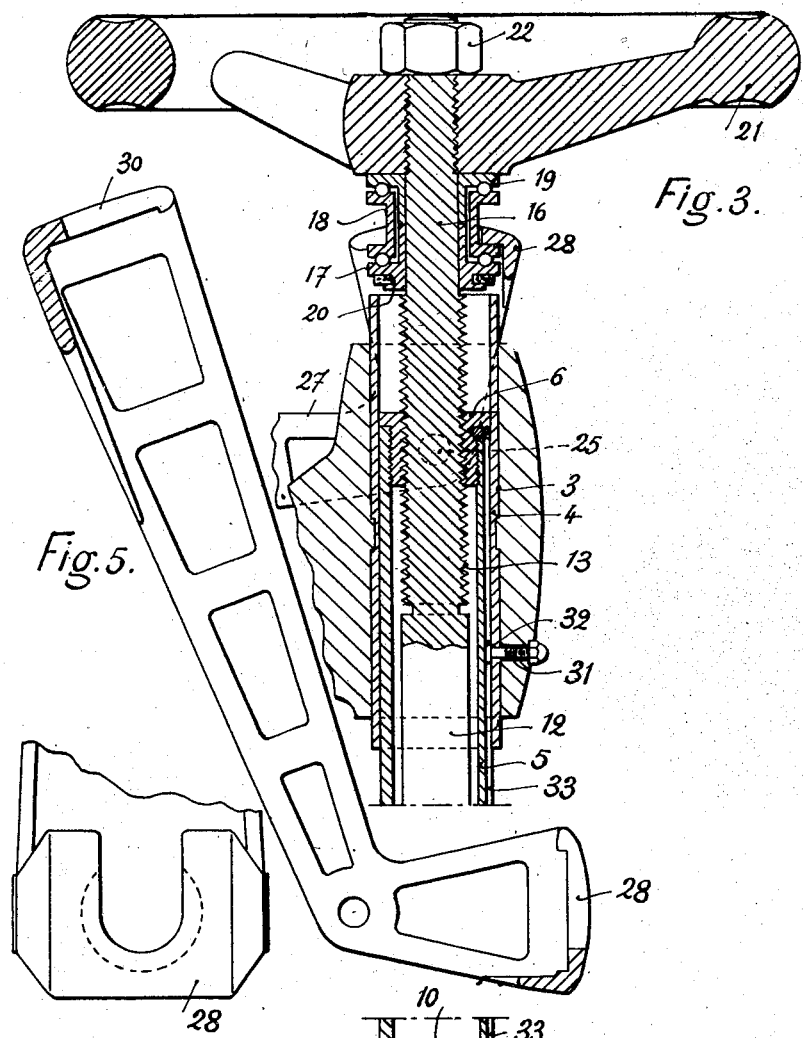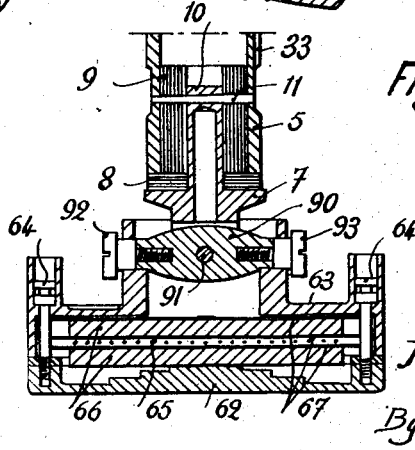

Patented Sept. 2, 1947

2,426,767

UNITED STATES PATENT OFFICE 2,426,767

RUBBER VULCANIZING MACHINE

Roland Dupont, Epernay, France

Application October 6, 1938, Serial No. 233,646
In France October 6, 1937

2 Claims. (Cl. 18—18)

The present invention relates to vulcanizing machines such as are commonly used for repairing the tires of automobiles, and for other purposes, and has for its object to provide an improved electrically heated machine of this type the operation of which is automatically controlled by the heat developed, so that heat is applied to the work at the temperature, and for the time necessary to ensure perfect vulcanization.

According to the invention, the improved vulcanizing apparatus comprises an electrically heated pressure member, means for applying said member with pressure to the work, and thermal control means for the electric heating circuit comprising a switch device which is adapted to be held in the closed position with the aid of a fuse member which disintegrates and releases the switch device to move into the open position, when the pressure member attains a predetermined temperature.

According to another feature, the invention includes the provision in a vulcanizing apparatus, of an electrically heated pressure member, whose heating circuit is controlled by a switch device rendered operative to complete the heating circuit by means of a fuse member of predetermined size and shape, which disintegrates and causes operation of the switch device to break the heating circuit, when the pressure member attains a predetermined temperature.

The invention also includes vulcanizing apparatus in which the vulcanizing heat is produced electrically under the control of a thermally controlled switch device rendered operative by the insertion in the apparatus of a fuse member of specific size and shape, which is subject to the heat developed by the apparatus. Furthermore, the invention includes fuse members for insertion in apparatus of this kind made of fusible metal of a shape and size conforming to an insertion opening in the vulcanizing apparatus.

Other features of the invention relate to the means for applying the heated pressure member to the work. Thus vulcanizing apparatus according to the invention may comprise a frame, an extending tubular member carrying an electrically heated pressure applying member, slidably mounted in said frame, means for setting said tubular member in a plurality of positions in said frame, and manually operated screw means for extending said tubular member.

It may also include a counterpressure head for supporting the work, comprising a spring mounted platform associated with a pressure indicating device the movement of which depends upon the degree of compression of the spring means supporting said platform.

Preferably the spring platform is connected to a tension spring by a flexible cable which passes round a drum associated with a rotary pressure indicating pointer.

Other minor features of the invention will appear from the claims appended hereto and forming part of this specification.

In order that the invention may be more readily understood, and carried into practice, a construction of tire vulcanizing machine in accordance with the invention is shown, by way of example only, in the accompanying drawings, which are therefore to be taken in an illustrative and non-limitating sense. In the drawings:

Figure 1 shows a tire vulcanizing machine according to the invention, in elevation, with parts shown in section.

Fig. 2 is an enlarged detail section taken on the line A—B of Fig. 1.

Fig. 3 is an enlarged detail vertical sectional view through the upper socket of the machine and the manually controlled wheel connected thereto.

Fig. 4 is an enlarged detail transverse section of the pressure bar.

Fig. 5 is a detail sectional view of the long stirrup limb.

Fig. 6 is a detail view in elevation of the nose of long stirrup limb as shown in Fig. 5.

Fig. 7 is a longitudinal sectional view through the electrically heated casing of the pressure bar.

Fig. 8 is a plan view of the same.

Fig. 9 is an enlarged sectional view of the control switch when the contacts thereof are in opened position.

Fig. 10 is a detail plan view of the cover guide.

Figure 11 is a perspective view of a fuse member forming an element of the present device.

Referring to the drawings, the frame of the machine comprises a swan neck arm 1 which is fixed on a bench, or any suitable support, with the aid of the base 2, by means of screws or bolts. The upper end of the arm 1 carries a head portion bored at 3 and bushed with a steel socket 4 (Figure 3). In the socket 4 is mounted and slides the pressure system which comprises a tube 5 carrying at its upper end a threaded socket 6. On the lower end of the tube 5 is fixed a steel cap 7 which is heat insulated from the tube 5 by a number of mica washers 8, and a tube of Bakelised paper 9. The tail piece 10 of the cap is reduced in size and a pin 11 assembles it on the tube 5.

A rod or shaft 12 threaded at 13 screws into the socket 6. Towards the bottom of the rod 12 is cut a groove 14 which receives balls 15 which run on the inside of the tube 5 and prevent the rod 12 from striking against the tube 5.

Towards the upper end of the rod 12 is formed a shoulder 16 on which is mounted a ball thrust bearing formed by the parts 17, 18 and 19, between which are interposed rings of steel balls.

The part 17 is grooved peripherally at 20. In this groove is a rubber or fibre washer for absorbing shocks. On the upper end of the rod 12 is screwed a hand wheel 21, locked by a nut 22. The tube 5 is notched at the points 23 and 24. On opposite sides of the head of the frame 1 is pivoted at 25 a double stirrup 27 having two limbs (one short and one long) integral with one another.

In the position shown in Figure 1, the nose 28 of the short stirrup limb is lodged in the annular groove of the collar 18, and the bar 29 is held in its lowest working position. If the hand wheel 21 is turned in one direction or the other the tube 5 will fall or rise, either taking the casing 29 with it in the upward direction, or exerting a pressure of the casing 29 in the downward direction.

If the pressure is relieved and the nose 28 of the double stirrup 27 disengaged from the groove of the collar 18 by raising the other arm of the double stirrup and if the hand wheel 21 is then moved upwardly, the nose 28 of the double stirrup 27 can be engaged in the recesses 23, 24 in the tube 5 when these recesses come opposite to the nose 28. The whole pressure system will then be held in the raised or non-working position, including the casing 29, to permit the preparation of the work for vulcanization.

The nose 30 of the long stirrup limb serves to permit the repairing or vulcanizing of objects of considerable thickness. Thus, if after having disengaged the nose 28 of the short stirrup from collar 18, the hand wheel 21 is raised and, by rotating the stirrup about its axis 25, the nose 30 of the long stirrup limb is engaged in the groove of the collar 18, the casing 29 will be held at the maximum working height and pressure can be exerted on a work piece of every great thickness. A screw 31 having a flattened head 32 prevents the tube 5 from rotating, the flattened head 32 fitting in a groove 33 formed along the tube 5.

The counterpressure system comprises a tube 34 sliding in a socket 35 held in the lower head 36 of the frame. The tube 34 is solid with a small platform 40 which in turn carries, by means of two screws and nuts 41, a large platform 42 with a dove tail edging, in which is located a rubber pad 43 of suitable thickness. This pad 43 will be convex on its upper surface if it is to be used for repairing curved objects; on the other hand it will be flat on its upper surface if flat objects are to be repaired or vulcanized.

The rubber pad 43, particularly when it has a flat surface, will be covered with cloth or other flexible material, thin and non-extensible, in order to avoid lateral spreading of the rubber pad as a result of the pressure exerted by the casing 29.

The lower part of the tube 34 rests on a metal disc 44 which in turn rests on a series of washers, such as Belleville washers, suitably disposed to bear in their turn on a metal socket 46 made solid with a sleeve 35 fixed in the head 36.

In a recess formed in the centre of the disc 44 is lodged the end of a cable 47. This cable slides in a sheath 48 which is held by an abutment guide post 49. The cable 47 passes one or more times round a drum 50 made solid with a pinion 51, and the two rotate about an axis pin 52. The end of the cable 47 is attached to a spring 53 fixed in turn to a screw 54.

The teeth of a small pinion 55 mesh with the teeth of the large pinion 51. An axis pin 56 made solid with the pinion 55 carries a pointer 57 which moves over a graduated scale 58. A button 59 permits the setting of the pointer to zero when required.

The above parts are covered in and protected by a casing fastened to the frame 1 by screw bolts 60, carrying the necessary securing nuts and washers.

If the rod 12 is rotated by means of the hand wheel 21, it screws into the threaded socket 6. The rod 12 then tends to rise, but this movement is prevented by the nose 28 or 30 of the double stirrup. A downward pressure is therefore exerted on the socket 6 and on the tube 5, which through the casing 29 and the work piece, is applied to the plate 42, as a result of which the Belleville washers 45 are compressed. The cable 47 is relaxed and the pull of spring 53 draws the cable 47 tight and this rotates the drum 50. The drum 50 in turn rotates the pinion 51, which then drives the small pinion 55, and rotates the pointer 57 through an angle proportional to the pressure exerted.

The automatically controlled electrically heated casing 29 (Figures 7–10) comprises a bottom 62 and a cover 63 connected together by screws 64.

Within this casing are suitably disposed one or more electric heating resistances 65 of known type. This resistance or these resistances is or are interposed between sheets of metal 66, having a high coefficient of specific heat. The resistance 65 and the plates 66 are insulated by plates 67 of micanite, or other insulating material (the balls 68 serve simply to locate the lower plate 62).

As shown in Figure 7 the electric current enters through a terminal 69, passes through the resistance 65, the terminal 70, the oscillating blade 71, the contact studs 72 and 73, the fixed blade 74, the terminal 75, and leaves by the terminal 69′, a conductor connecting the terminal 69′ to the terminal 75.

The bottom 62 has only a relatively small central contact area with the lower metal plate 66. This is to cause the heat arising from the plate 66 to pass through the centre of the bottom 62, and to distribute itself peripherally from this centre over the whole lower surface of the bottom 62. Thus the heat is always greater by several degrees at the centre than at the edges, as the result of which a better heating effect will be obtained at the centre of the repair, where the thickness to be vulcanized is the greatest.

The bringing into contact of the studs 72 and 73 to complete the electric circuit and cause the heating of the casing 29, and the separation of the studs 72 and 73 to break the electric circuit and terminate the heating of the casing 29 are automatically effected, as will now be described.

In Figure 9 is shown a part of the casing with the automatic switch system in inoperative condition i. e., the contacts 72 and 73 are open. If in the cover guide 76 (which has been removed in Figure 8) there is disposed in the recess 77 a fuse 78, whose ends are of cylindrical, or any other suitable shape, consisting of a metal, or metal alloy, or any other body which disintegrates at the desired temperature, this fuse 78 will pass through the opening 79 which is exactly shaped and proportioned to receive it. The fuse will then fall upon the oscillating table 80, into a notch 80' of appropriate size and shape. If pressure is applied to the end of the table 80, upon the button 81, the fuse 78 will roll downwardly. The two extractor prongs 82 will then enter the two ends of the notch 80' and will have the effect of dislodging the fuse 78, which will roll down the table 80 until it strikes against a metal blade 83 whose end projects through an aperture in table 80 and is of slightly hooked shape. This blade is extended into the interior of the heating casing 29 in order that it may heat up to the temperature of the casing.

If the button 81 is now released, the table 80 will remain in the downwardly inclined position, the fuse 78 being held by blade 83 spanning the aperture through which blade 83 projects, thus providing a locking action. The table 80 in its downward swinging movement about the ends of the screws 84 and 85 as pivots, takes with it the pin 86, which is of insulating material. This permits the movable blade 71 to be moved downwardly under the pull of the spring 87. The contact stud 73 then comes into contact with the contact stud 72 as shown in Figure 7, which establishes the flow of current.

When the heat given out by the resistance has sufficiently heated the whole of the casing 29 to attain the temperature of vulcanization, and for the metal plates 66 to have accumulated sufficient heat to enable the temperature to be maintained for several minutes, the fuse 78, heated by the blade 83, fuses or disintegrates under the action of the heat and releases the oscillating table 80 for return upwardly by the springs 88. The electric circuit then becomes interrupted since the insulating pin 86 in its upward motion carries with it the movable blade 71 rotatable about an axis 89, thereby separating the contact studs 72, 73.

The casing 29 (Figure 7) is connected to the pressure member 5 through the intermediary of a "Cardan" joint constituted by the cap 7, the yoke piece 90, the pivot pin 91, and the two pivot screws 92, 93.

It will be understood that the above apparatus may be modified in many ways without departing from the invention and is therefore not by any means limited to the construction of vulcanizing apparatus described and illustrated, which is merely one embodiment of the invention as applied to a vulcanizing apparatus for tires. Other constructions for other purposes may obviously be devised in accordance with the invention.

Having now described this invention and in which manner same is to be performed, what I claim is:

1. A vulcanizing apparatus comprising a frame, telescopic members slidably mounted on said frame, an electrically heated pressure member carried by one end of one of said telescopic members, manually operable screw means for extending said telescopic members one from the other, a thermal control means controlling the electric current to said pressure member, a counter-pressure head for supporting the work to be treated, a spring supporting said counterpressure head upon said frame, a flexible cable connected at one end to said pressure head, a drum rotatably mounted upon said frame and connected to a rotary pressure-indicating pointer, said drum having said cable passing therearound, and a tension spring connected to said frame and to the opposite end of said cable.

2. An electrically heated pressure member for vulcanizing machines comprising a bottom member, a cover, means for connecting said bottom to said cover for forming a space therebetween, a restricted contact surface formed on the inner face of said bottom member and having recesses formed therein, a pair of metal plates arranged within the space between said bottom member and cover, a resistance element arranged between said plates, a restricted contact surface formed on one of said plates, and contacting with the restricted contact surface of said bottom member, said restricted contact surface of said plate having recesses formed therein and aligning balls arranged within said recesses.

ROLAND DUPONT.

REFERENCES CITED

The following references are of record in the file of this patent:

UNITED STATES PATENTS

| Number | Name | Date |
|---|---|---|
| 1,839,877 | Heintz | Jan. 5, 1932 |
| 1,147,847 | Dennis | July 27, 1915 |
| 1,309,845 | Dennis | July 15, 1919 |
| 2,041,362 | McIlveney | May 19, 1936 |
| 2,072,497 | Dupont | Mar. 2, 1937 |
| 1,596,003 | Davis | Aug. 17, 1926 |

FOREIGN PATENTS

| Number | Country | Date |
|---|---|---|
| 449,376 | Great Britain | June 25, 1936 |
| 782,044 | France | Mar. 11, 1935 |
| 18,747 | Great Britain | 1914 |